United States Patent
Yang et al.

(10) Patent No.: US 12,335,991 B2
(45) Date of Patent: Jun. 17, 2025

(54) METHOD OF SELECTING ACCESS POINT AND RELATED COMMUNICATION DEVICE

(71) Applicant: Realtek Semiconductor Corporation, Hsinchu (TW)

(72) Inventors: Po-Han Yang, Hsinchu (TW); Chien-Hsun Liao, Hsinchu (TW); Ting-Yao Chiu, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 454 days.

(21) Appl. No.: 17/934,578

(22) Filed: Sep. 23, 2022

(65) Prior Publication Data

US 2023/0239911 A1    Jul. 27, 2023

(30) Foreign Application Priority Data

Jan. 26, 2022  (TW) .................. 111103450

(51) Int. Cl.
*H04W 48/20* (2009.01)
*H04W 72/0453* (2023.01)
*H04W 72/542* (2023.01)

(52) U.S. Cl.
CPC ......... *H04W 72/542* (2023.01); *H04W 48/20* (2013.01); *H04W 72/0453* (2013.01)

(58) Field of Classification Search
CPC ........................ H04W 72/542; H04W 48/20
USPC ........................................... 370/329
See application file for complete search history.

(56) References Cited

U.S. PATENT DOCUMENTS

| | | |
|---|---|---|
| 2010/0142396 A1 | 6/2010 | Kim et al. |
| 2011/0216692 A1 | 9/2011 | Lundsgaard et al. |
| 2017/0086256 A1 | 3/2017 | Chen et al. |
| 2019/0279655 A1* | 9/2019 | Kristjansson ........... G06F 3/167 |
| 2023/0128650 A1* | 4/2023 | Haas .................... H04B 17/318 |

\* cited by examiner

*Primary Examiner* — Sibte H Bukhari
(74) *Attorney, Agent, or Firm* — CKC & Partners Co., LLC

(57) ABSTRACT

A method of selecting access point, suitable for a communication device, includes following operations: (a) monitoring a channel of at least one frequency band; (b) calculating a first count that the channel is detected to be in an occupied state; (c) calculating a second count that the channel is detected to have an ambient noise; (d) repeating steps (a) through (c) to obtain the first count and the second count of each of a plurality of channels used by a plurality of access points; (e) obtaining a plurality of received signal strength indications (RSSIs) of the plurality of access points, respectively; and (f) selecting a target channel from the plurality of channels and a target access point from the plurality of access points to perform connection according to the plurality of RSSIs and the first count and the second count of each of the plurality of channels.

20 Claims, 7 Drawing Sheets

METHOD OF SELECTING ACCESS POINT AND RELATED COMMUNICATION DEVICE

RELATED APPLICATIONS

This application claims priority to Taiwan Application Serial Number 111103450, filed on Jan. 26, 2022, which is herein incorporated by reference in its entirety.

BACKGROUND

Field of Invention

The disclosure is related to a communication technology of wireless local area network. More particularly, the disclosure is related to a method for selecting an access point and a communication device.

Description of Related Art

In modern times, people's daily life is inseparable from mobile devices and the Internet, and wireless access points that provide Wi-Fi connections can be found everywhere in public facilities and home environments. A conventional mobile device sorts the access points in the wireless network environment according to the received signal strength indicator (RSSI), and automatically connects to the one with the largest RSSI. The transmission speed of an access point in the 2.4 GHz frequency band is much slower than that in the 5 GHz frequency band, and the 2.4 GHz frequency band is also more susceptible to radio interference from household appliances. In addition, it is not possible to determine the current transmission volume of the access point is high with only RSSI, which may cause transmission delay. All in all, conventional mobile devices do not take noise intensity and delay into consideration when selecting access points, which often causes users to experience network delays and degrades user experience.

SUMMARY

The disclosure provides a method of selecting access point for a communication device. The method includes following operations: (a) monitoring a channel of at least one frequency band; (b) calculating a first count that the channel is detected to be in an occupied state; (c) calculating a second count that the channel is detected to have an ambient noise; (d) repeating steps (a) to (c) to obtain the first count and the second count of each of a plurality of channels used by a plurality of access points; (e) obtaining a plurality of received signal strength indications (RSSIs) of the plurality of access points, respectively; and (f) selecting a target channel from the plurality of channels and a target access point from the plurality of access points to perform connection according to the plurality of RSSIs and the first count and the second count of each of the plurality of channels.

The disclosure provides a communication device including an antenna and a baseband circuit. The antenna is configured to transmit or receive radio-frequency signals in at least one frequency band. The baseband circuit is coupled to the antenna, and is configured to: (a) monitoring a channel of the at least one frequency band; (b) calculating a first count that the channel is detected to be in an occupied state; (c) calculating a second count that the channel is detected to have an ambient noise; (d) repeating steps (a) to (c) to obtain the first count and the second count of each of a plurality of channels used by a plurality of access points; (e) obtaining a plurality of received signal strength indications (RSSIs) of the plurality of access points, respectively; and (f) selecting a target channel from the plurality of channels and a target access point from the plurality of access points to perform connection according to the plurality of RSSIs and the first count and the second count of each of the plurality of channels.

One of the advantages of the above method and communication device is that it can comprehensively consider the RSSI of the access point, the delay of the channel and the noise intensity of the channel, so as to automatically connect to the most efficient channel and access point for data transmission.

It is to be understood that both the foregoing general description and the following detailed description are by examples, and are intended to provide further explanation of the disclosure as claimed.

DETAILED DESCRIPTION

Figure 1:
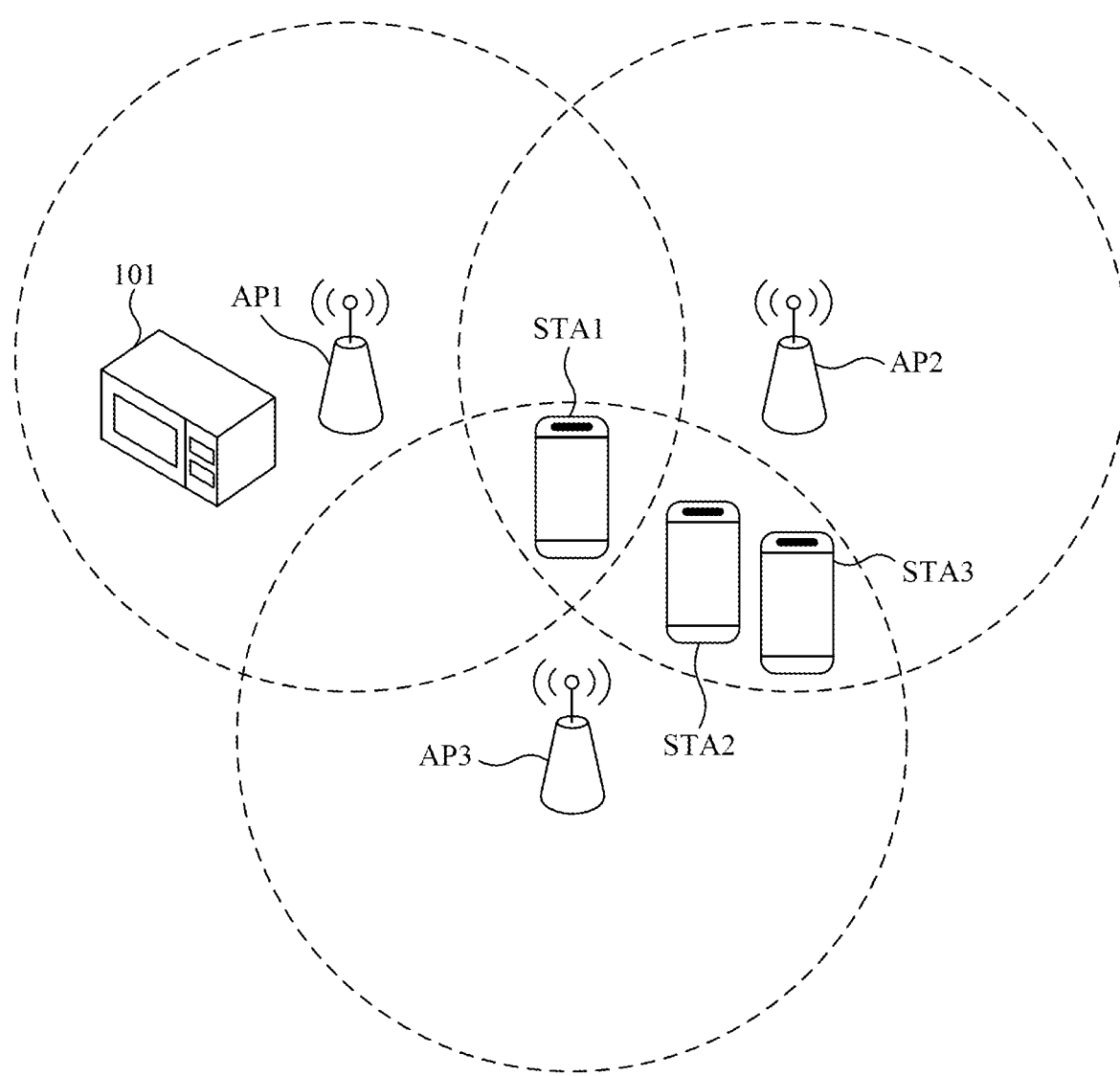
FIG. 1 is a schematic diagram of a wireless network environment in accordance with an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a schematic diagram of a wireless network environment 100 in accordance with an embodiment of the present disclosure. The wireless network environment 100 includes a plurality of access points AP1-AP3, a plurality of communication devices STA1-STA3, and a household appliance 101 (e.g., a microwave oven). The access points AP1-AP3 may be electronic devices supporting the IEEE 802.11 Wi-Fi protocol. For example, the access points AP1-AP3 may be wireless routers. As another example, the communication devices STA1-STA3 may be smart phones, notebook computers, or other portable electronic devices with wireless communication capabilities. The communication device STA1 is located within the communication range of the access points AP1-AP3, that is, the communication device STA1 can detect the existence of the access points AP1-AP3 by active scanning or passive scanning, and connect to one of the access points AP1-AP3. For example, the communication device STA1 can access the Internet through one of the access points AP1-AP3. The communication devices STA2-STA3 also have functions similar to those of the communication device STA1, and similar detailed description is omitted. The boundaries of the communication range are represented by dashed lines in FIG. 1, and the access points AP1-AP3 are located at the center of their communication range. However, the configuration and arrangement of various devices in FIG. 1 are only for ease of understanding, and the present disclosure is not limited thereto.

Figure 2:
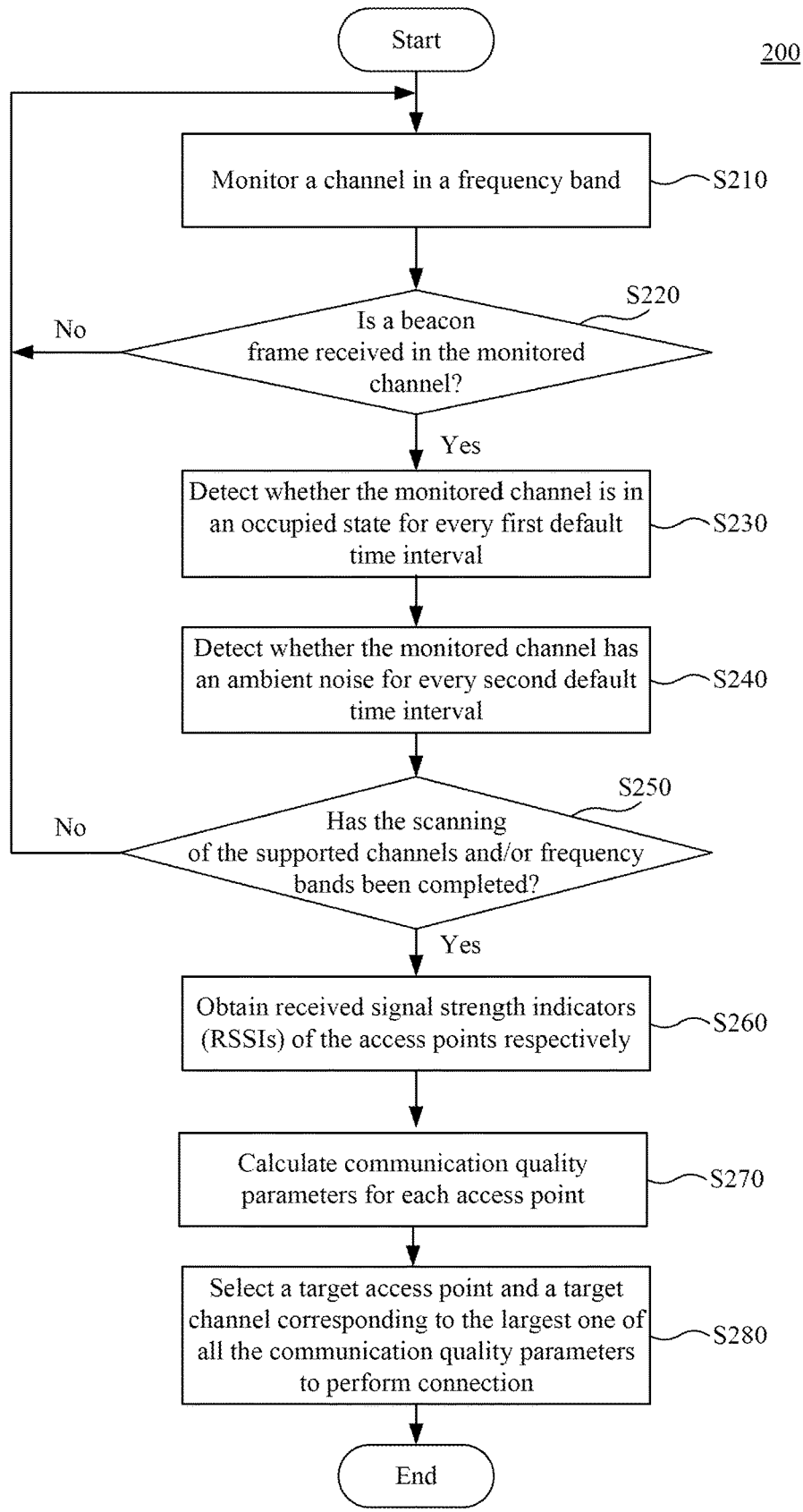
FIG. 2 is a flowchart of a method for selecting an access point in accordance with an embodiment of the present disclosure.

FIG. 2 is a flowchart of a method 200 for selecting an access point in accordance with an embodiment of the present disclosure. Any method described herein may include more or fewer steps than those shown in the flowchart, and the steps of the method may be performed in any suitable order. The communication device STA1 may perform the method 200 to connect to the access point, frequency band, and channel that are most efficient for data transmission and have the least interference.

In the following embodiments of the present disclosure, the frequency bands supported and the channels used by the access points AP1-AP3 are shown in Table 1 below. However, the configuration of frequency bands and channels shown in Table 1 is only for convenience of description, and the present disclosure is not limited thereto. Person having ordinary skill in the art can realize the channel numbers of the 2.4 GHz and 5 GHz frequency bands and the center frequency of each channel, and similar detailed description is omitted.

TABLE 1

|   | frequency band | channel |
| --- | --- | --- |
| access point AP1 | 2.4 GHz | 1, 6 |
| access point AP2 | 5 GHz | 149, 153, 161 |
| access point AP3 | 5 GHz | 153, 161 |

In some embodiments, the interference source in the wireless network environment 100 may be the household appliance 101 near the access point AP1 in FIG. 1. The radio waves generated by the household appliance 101 may interfere with the communication between the communication device STA1 and the access point AP1. In other embodiments, the interference source may also be the communication devices STA2-STA3 located within the communication range of the access points AP2-AP3. If the communication devices STA2-STA3 intensively use the 5 GHz frequency band to transmit packets, the chance of signal collision in the air in the 5 GHz frequency band will increase, thereby interfering with the communication between the communication device STA1 and the access point AP2 or AP3. The operation of the communication device STA1 when performing each step of the method 200 will be further described below.

Figure 3:
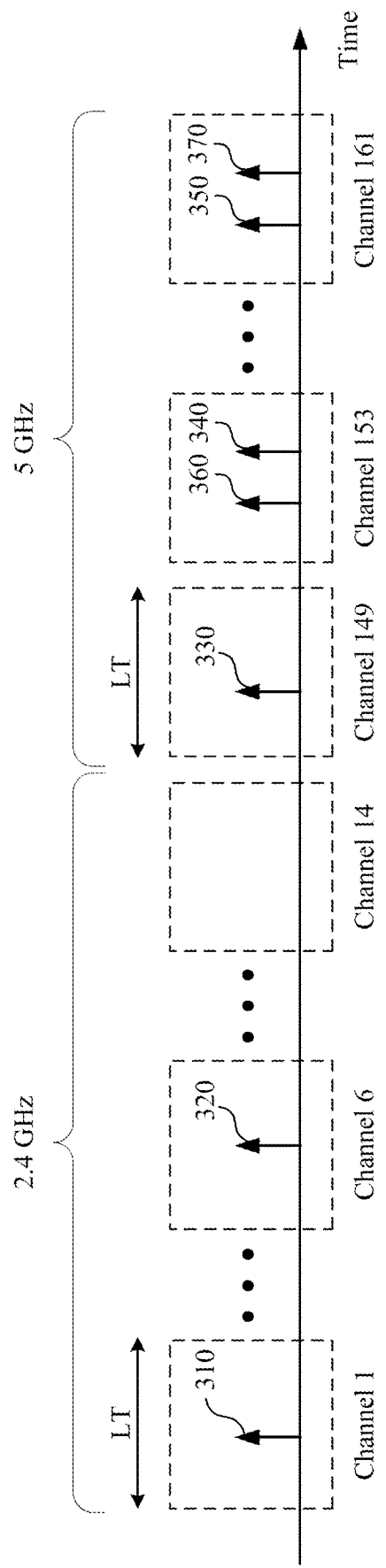
FIG. 3 is a schematic diagram of channel scanning performed by a communication device in accordance with an embodiment of the present disclosure.

Please refer to FIG. 2 and FIG. 3. FIG. 3 is a schematic diagram of channel scanning performed by the communication device STA1 in accordance with an embodiment of the present disclosure. The communication device STA1 may perform steps S210-S250 many times to scan a plurality of channels in the frequency bands (e.g., 2.4 GHz and 5 GHz) supported by the communication device STA1. First, in step S210, the communication device STA1 may select "Channel 1" in the 2.4 GHz frequency band, and continuously monitor the signal in "Channel 1" during a monitoring period LT.

In step S220, the communication device STA1 determines whether a beacon frame is received in the currently monitored channel. If the communication device STA1 receives a beacon frame during the monitoring period LT, the communication device STA1 will determine that the channel corresponds to an available wireless network, and then perform steps S220-S250 to obtain relevant information of the channel, such as noise intensity or delay, etc. For example, as shown in FIG. 3, since the communication device STA1 receives the beacon frame 310 of the access point AP1 during the monitoring period LT of "Channel 1," the communication device STA1 can record the information of "Channel 1". On the other hand, if the communication device STA1 does not receive a beacon frame during the monitoring period LT, the communication device STA1 can determine that the channel does not correspond to an available wireless network, and the communication device STA1 may switch to another channel and/or another frequency band after the monitoring period LT ends, and perform step S210 again.

Figure 4:
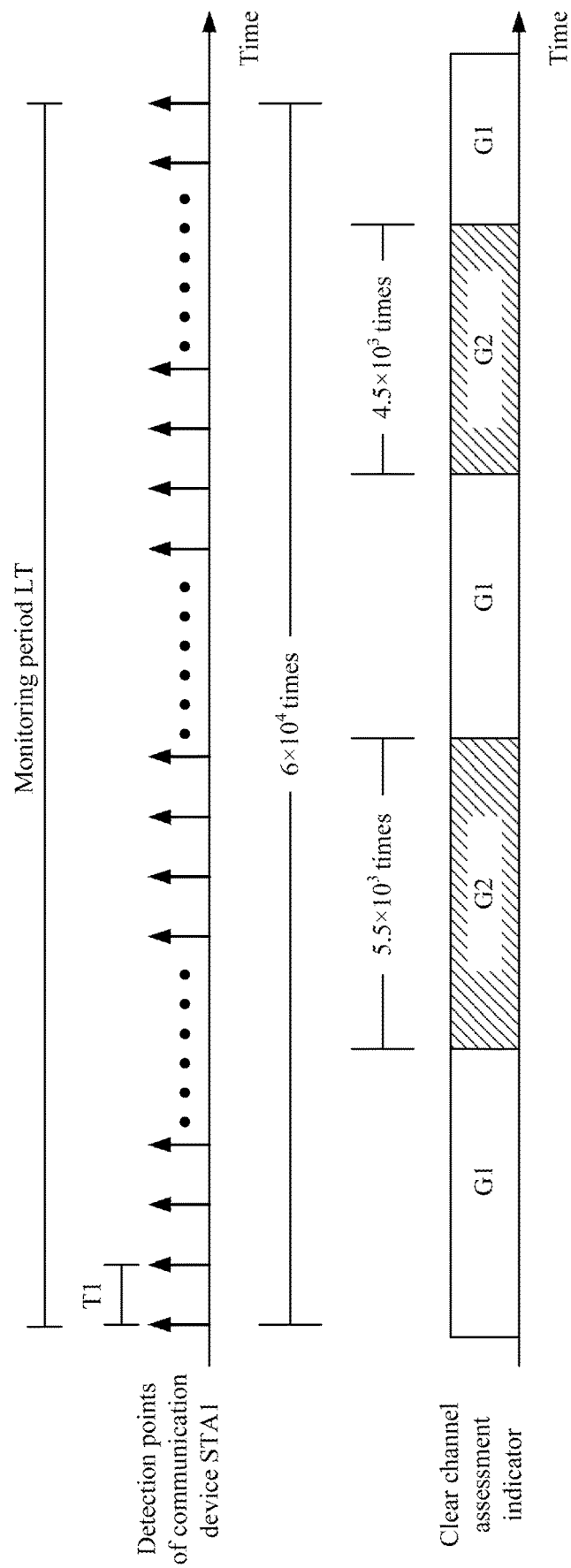
FIG. 4 is a schematic diagram of a detection of whether a channel is in an occupied state performed by a communication device in accordance with an embodiment of the present disclosure.

Please refer to FIG. 2 and FIG. 4 next. FIG. 4 is a schematic diagram of a detection of whether a channel is in an occupied state performed by the communication device STA1 in accordance with an embodiment of the present disclosure. In step S230, during the monitoring period LT, the communication device STA1 may detect whether the currently monitored channel is in an occupied state for every first default time interval T1 (e.g., 4 microseconds (us)). If so, the count of the channel in the occupied state will increase by 1 to obtain, when the monitoring period LT ends, a first count that the channel is detected to be in the occupied state. For example, in the embodiment shown in FIG. 4, the communication device STA1 has detected "Channel 1" for a total of $6 \times 10^4$ times during the monitoring period LT, and detected that "Channel 1" is in the occupied state at a total of $10^4$ detection points. Therefore, the communication device STA1 will set the first count of "Channel 1" to $10^4$.

In one embodiment, if the communication device STA1 detects that the channel is being configured to transmit packets in a predetermined format (e.g., Wi-Fi packets), the communication device STA1 determines that the channel is in the occupied state. Otherwise, the communication device STA1 determines that the channel is in an idle state.

In some embodiments, the communication device STA1 may determine whether the channel is being configured to transmit packets of a predetermined format by clear channel assessment (CCA) operation. For example, the CCA operation includes a carrier sense step, which is configured to identify the preamble with a specific format, and the preamble may record the data length of the packet, so as to determine whether the channel has packets in the predetermined format and how long the channel will be occupied. For example, as shown in FIG. 4, when the result of the CCA operation is that "Channel 1" is being configured to transmit packets in a predetermined format, the CCA indicator in the communication device STA1 may be switched to a first logic value G1, thus the communication device STA1 can determine that the "Channel 1" is in the occupied state when performing the aforementioned detection. On the contrary, the CCA indicator in the communication device STA1 may be set to a second logic value G2, thus the communication device STA1 determines that "Channel 1" is in the idle state.

Figure 5:
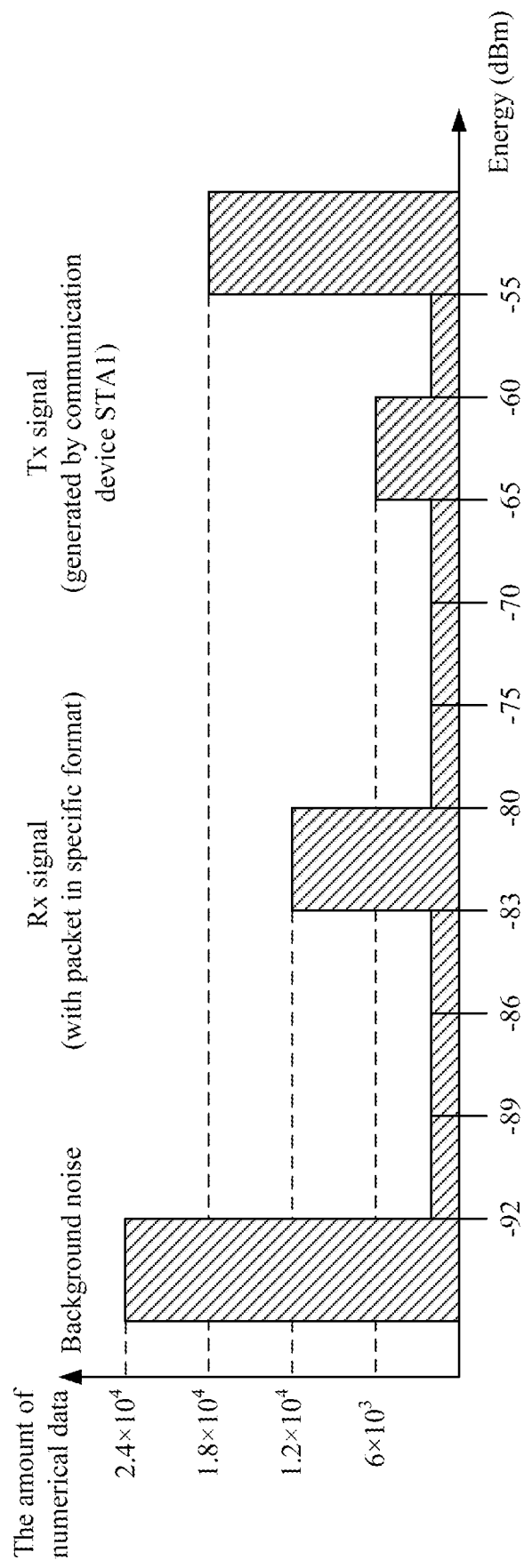
FIG. 5 is a schematic diagram of a detection of whether the channel has an ambient noise performed by a communication device in accordance with an embodiment of the present disclosure.

Please refer to FIG. 2 and FIG. 5 next. FIG. 5 is a schematic diagram of a detection of whether the channel has an ambient noise performed by the communication device STA1 in accordance with an embodiment of the present disclosure. In step S240, during the monitoring period LT, the communication device STA1 may detect whether the currently monitored channel has an ambient noise for every second default time interval T2 (e.g., 4 microseconds (us)). If the communication device STA1 determines that the currently monitored channel has an ambient noise, the count of the channel with ambient noise will be increased by 1, when the monitoring period LT ends, a second count that the channel is detected to have ambient noise. In some embodiments, the second default time interval is same as or different from the first default time interval T1 in step S230. In other embodiments, the order of steps S230 and S240 may be interchanged, or steps S230 and S240 may be performed simultaneously.

Specifically, the communication device STA1 may record the magnitude of received energy as numerical data in each detection, and classify all the numerical data obtained during the monitoring period LT into different levels according to the magnitude, so as to obtain a statistical chart as shown in FIG. 5. In some embodiments, a plurality of classification thresholds may be pre-stored in the communication device STA1 as a basis for classifying the numerical data, such as −92 dBm, −89 dBm, −86 dBm, −83 dBm, −80 dBm, −75 dBm, −70 dBm, −65 dBm, −60 dBm and −55 dBm. However, the present disclosure is not limited thereto, and the amount and value of the classification thresholds may be adjusted according to actual design requirements. The communication device STA1 may further store an interference threshold. When the numerical data is greater than or equal to the interference threshold, it means that the channel may have an ambient noise during the detection.

In some embodiments, the interference threshold is between −75 dBm and −92 dBm. In this case, as shown in FIG. 5, a total of about $3.6 \times 10^4$ detections indicate that "Channel 1" may have an ambient noise. In one embodiment, the interference threshold is −80 dBm.

It is worth mentioning that, in addition to the ambient noise, the following factors may also cause the communication device STA1 to record numerical data that greater than the interference threshold: (1) radio-frequency signals having packets in specific format (e.g., Wi-Fi packets) generated by the access points AP1-AP3 and the communication devices STA2-STA3; and (2) radio-frequency signals generated by the communication device STA1 itself when the communication device STA1 sends packets. Therefore, in some embodiments, in the numerical data greater than the interference threshold, the communication device STA1 may not need to consider the part caused by the above factors, and count the amount of numerical data that actually caused by the ambient noise as the second count.

For example, as shown in FIG. 5, the communication device STA1 does not need to consider the $1.2 \times 10^4$ pieces of numerical data in the range of −83 dBm through −80 dBm, because these numerical data correspond to the radio-frequency signals (Rx signals) that generated by other devices and with Wi-Fi packets. The communication device STA1 also does not need to consider the $6 \times 10^3$ pieces of numerical data in the range of −65 dBm through −60 dBm, because these numerical data are sampled during the period when the communication device STA1 transmits the radio-frequency signal (Tx signal). Therefore, the communication device STA1 may only consider about $1.8 \times 10^4$ pieces of numerical data greater than −55 dBm, and set the second count of "Channel 1" to about $1.8 \times 10^4$.

In some embodiments, the monitoring periods LT of the plurality of channels may be different. In order to cope with possibly different monitoring periods LT for the plurality of channels, or to save memory space, the communication device STA1 may standardize the first count and the second count obtained in steps S230 and S240.

For example, in step S230, during the monitoring period LT, the communication device STA1 may obtain a first total detection count of detecting whether the channel is in the occupied state, and divide the first count by the first total detection count to obtain the first percentage number of the channel. In the embodiment of FIG. 4, by dividing $10^4$ by $6 \times 10^4$, it can be known that the first percentage number of "Channel 1" is approximately 16.67%.

As another example, in step S240, during the monitoring period LT, the communication device STA1 may obtain a second total detection count of detecting whether the channel has an ambient noise, and divide the second count by the second total detection count to obtain the second percentage of the channel. In the embodiment of FIG. 5, it is assumed that the first default time interval is substantially equal to the second default time interval, and therefore the second total detection count is $6 \times 10^4$. By dividing $1.8 \times 10^4$ by $6 \times 10^4$, the second percentage number for "Channel 1" is 30%.

Please refer to FIG. 2 again, in step S250, the communication device STA1 determines whether the scanning of the channels and/or frequency bands supported by the communication device STA1 has been completed. If so, the communication device STA1 can then perform steps S260-S270 to analyze the first count and the second count (or the first percentage number and the second percentage number) of each channel to select the most efficient access point, frequency band and channel for data transmission. If the scanning of all channels and/or frequency bands has not been completed, the communication device STA1 may switch to another channel and/or another frequency band, and perform step S210 again.

In step S260, the communication device STA1 may obtain a plurality of received signal strength indicators (RSSIs) of the access points AP1-AP3 respectively. RSSI represents the relative strength of the signal received in the wireless network environment 100. In some embodiments, step S260 may be performed before step S210, or may be performed with any one of steps S210-S250 simultaneously.

By steps S210-S260, as shown in FIG. 3, the communication device STA1 receives the beacon frames 310 and 320 of the access point AP1 in "Channel 1" and "Channel 6"; receives the beacon frames 330 and 340 of the access point AP2 in "Channel 149," "Channel 153" and "Channel 161"; and receives the beacon frames 360 and 370 of the access point AP3 in "Channel 153" and "Channel 161." Therefore, the communication device STA1 may obtain the amount of the access points AP1-AP3 in the wireless network environment 100, as well as the frequency bands supported and the channels used by each of the access points AP1-AP3.

In step S270, the communication device STA1 calculates a plurality of communication quality parameters for each access point, and each communication quality parameter is configured to indicate the communication quality of the access point when communicating through a corresponding channel used by the access point.

For example, please refer to the above Table 1, the communication device STA1 calculates two communication quality parameters respectively corresponding to "Channel 1" and "Channel 6" for the access point AP1; calculates three communication quality parameters respectively corresponding to "Channel 149," "Channel 153" and "Channel 161" for the access point AP2; and calculates two communication quality parameters respectively corresponding to "Channel 153" and "Channel 161" for the access point AP3.

Each communication quality parameter can be calculated by the following Formula (1). In Formula (1), "Q" represents the communication quality parameter; "CLM" represents the first count or the first percentage number; "NHM" represents the second count or the second percentage number; "M" represents the number of the access point; "N" represents the number of the channel; "α" and "β" are default parameters, or in some embodiments, "α" and "β" may be adaptively adjusted by the user according to various factors of the environment (such as interference intensity), wherein "α" is greater than "13".

$$Q_{MN} = \alpha \times RSSI_M + \frac{\beta}{CLM_N + NHM_N} \quad \text{Formula (1)}$$

In an exemplary embodiment, "α" is 1 and "β" is 0.5, the RSSIs of the access points AP1-AP3 are assumed to be −60 dBm, −63 dBm and −64 dBm respectively, and the communication quality parameters of the access points AP1-AP3 are shown in Table 2 through Table 4 below.

TABLE 2

(the communication quality parameters of the access point AP1)

|  | Channel 1 | Channel 6 |
| --- | --- | --- |
| First percentage number | 2% | 3% |
| Second percentage number | 50% | 55% |
| communication quality parameter | −59.04 | −59.14 |

TABLE 3

(the communication quality parameters of the access point AP2)

|  | Channel 149 | Channel 153 | Channel 161 |
| --- | --- | --- | --- |
| First percentage number | 5.2% | 20% | 15% |
| Second percentage number | 5% | 7% | 2% |
| communication quality parameter | −58.1 | −61.15 | −60.06 |

TABLE 4

(the communication quality parameters of the access point AP3)

|  | Channel 153 | Channel 161 |
| --- | --- | --- |
| First percentage number | 20% | 15% |
| Second percentage number | 7% | 2% |
| communication quality parameter | −62.15 | −61.06 |

In the above embodiments, the first count and the first percentage number can be used to represent the delay of the channel. The higher the first count or the first percentage number, the greater the delay of the channel. The second count and the second percentage number can be used to represent the noise intensity of the channel. The higher the second count or second percentage number, the higher the noise intensity of the channel. Therefore, a larger communication quality parameter represents a better communication quality. In step S280, the communication device STA1 may select the access point and the channel corresponding to the largest one of all the communication quality parameters obtained in step S270 as the target access point and the target channel when performing connection, so as to obtain the best data transfer efficiency.

For example, in the above embodiments in Table 2 through Table 4, "Channel 1" and "Channel 6" are severely interfered by the household appliance 101. The communication device STA2 and the access point AP2 are communicating through "Channel 153", and the communication device STA3 and the access point AP3 are communicating through "Channel 161", thus there is a considerable delay in "Channel 153" and "Channel 161". Therefore, the maximum communication quality parameter "−58.1" reflects that the access point AP2 and "Channel 149" have relatively better connection quality. The communication device STA1 selects "Channel 149" and the access point AP2 as the target channel and the target access point, and connects to the access point AP2 through "Channel 149".

As the above, compared with the traditional method of selecting an access point only based on RSSI, the method 200 provided by the present disclosure considers the RSSI, the delay of the channel, and the noise intensity of the channel comprehensively. The communication device STA1 can automatically avoid using the 2.4 GHz frequency band, which usually has more noise, even though the access points in the 2.4 GHz frequency band usually have better RSSI. In addition, when different access points supporting the 5 GHz frequency band have similar RSSI values (such as access points AP2 and AP3), the communication device STA1 may use the channel and access point with less delay preferentially, and avoid using the channel and access point with greater delay.

Figure 6:
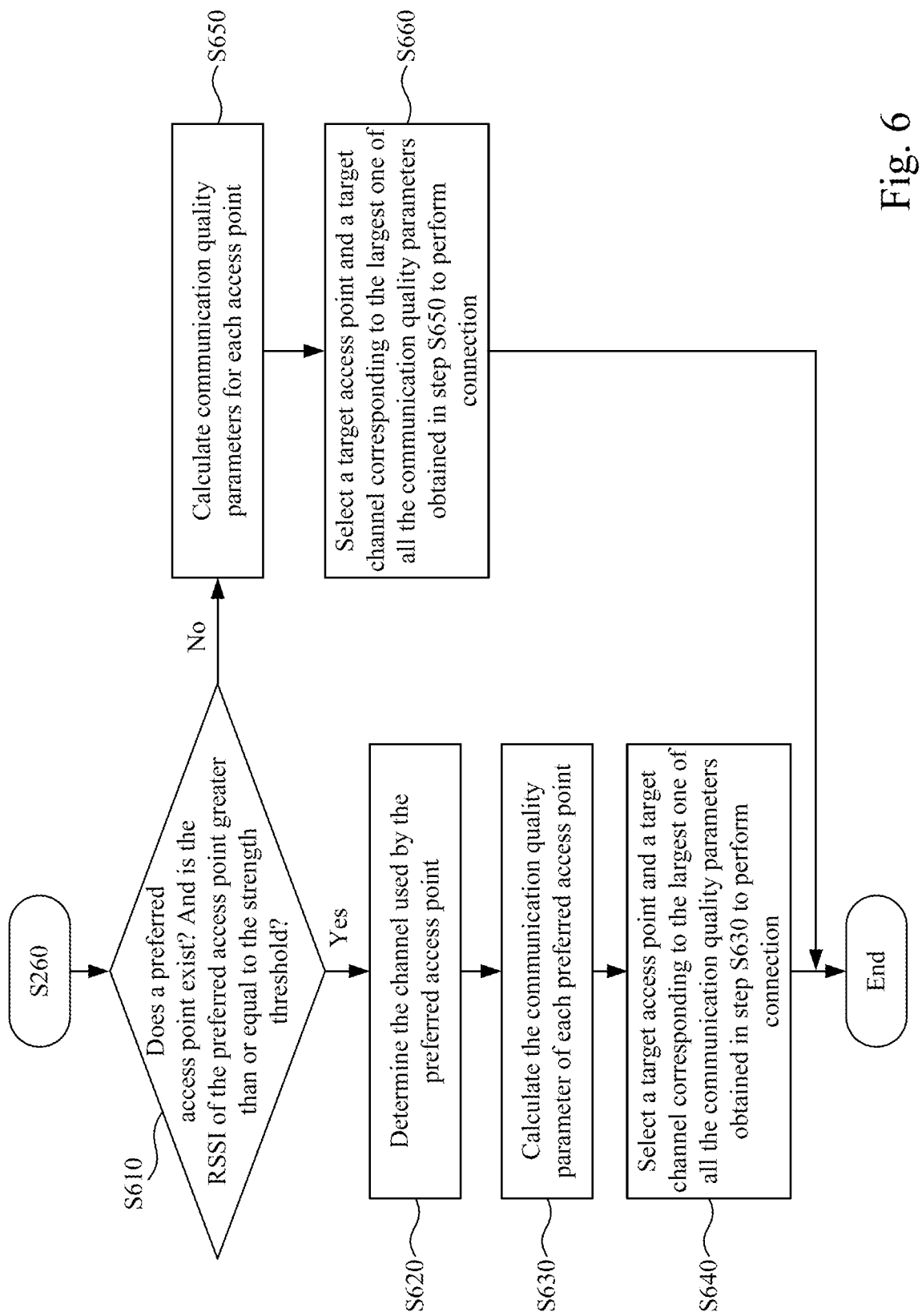
FIG. 6 is a partial flowchart of a method for selecting an access point in accordance with an embodiment of the present disclosure.

Please refer to FIG. 2 and FIG. 6. FIG. 6 is a partial flowchart of the method 200 for selecting an access point in accordance with an embodiment of the present disclosure. In some embodiments, the communication device STA1 may be set to preferentially select one of a plurality of frequency bands (hereinafter referred to as "preferred frequency band") to perform communication. In this case, steps S270-S280 in FIG. 2 may be replaced with steps S610-S660 in FIG. 6. For convenience of description, in the following embodiments, the communication device STA1 is set to preferentially select the 5 GHz frequency band, but the present disclosure is not limited thereto.

In step S610, the communication device STA1 determines whether there are one or more access points (hereinafter referred to as "preferred access points") that support the preferred frequency band (e.g., 5 GHz frequency band) in the wireless network environment 100, and whether the RSSIs of the preferred access points are greater than or equal to the strength threshold (e.g., −80 dBm). If so, the communication device STA1 can then perform steps S620-S640 to connect to one of the preferred access points. If there is no preferred access point or the RSSIs of the preferred access points are all less than the strength threshold, the communication device STA1 can then perform steps S650-S660 to comprehensively evaluate the connection quality of all access points in the wireless network environment 100. The following describes the detailed operation of the communication device STA1 with reference to the embodiments of FIG. 1, Table 3 and Table 4, when determining that there is a preferred access point in the wireless network environment 100 (i.e., the determination of step S610 is "Yes").

Since there are access points AP2 and AP3 supporting the 5 GHz frequency band in the wireless network environment 100, and the RSSIs of the access points AP2 and AP3 are greater than the strength threshold, the communication device STA1 will perform step S620 after step S610. In step S620, the communication device STA1 determines the channel used by the preferred access point (hereinafter referred to as the "preferred channel"). For example, the communication device STA1 determines that the preferred channel includes "Channel 149", "Channel 153" and "Channel 161" used by the access points AP2 and AP3.

Next, in step S630, the communication device STA1 calculates the communication quality parameter of each preferred access point according to the above Formula (1). For example, the communication device STA1 can calculate three communication quality parameters corresponding to "Channel 149", "Channel 153" and "Channel 161" for the access point AP2, and calculate two communication quality parameters corresponding to "Channel 153" and "Channel 161" for the access point AP3. The value of the communication quality parameters are shown in Table 3 and Table 4 above, which will not be repeated here.

In step S640, the communication device STA1 selects the preferred access point and the preferred channel corresponding to the largest one of all the communication quality parameters obtained in step S630 as the target access point and the target channel during connection, respectively. For example, the communication device STA1 will select "Channel 149" and the access point AP2 as the target channel and the target access point, and connect to the access point AP2 through "Channel 149".

The following describes the detailed operation of the communication device STA1 when determining that there is no preferred access point in the wireless network environment 100 or the RSSIs of the preferred access points are all less than the strength threshold (i.e., the determination of step S610 is "No"). In the following embodiments, the RSSIs of the access points AP1-AP3 are assumed to be −80 dBm, −83 dBm, and −87 dBm respectively.

Since the determination in step S610 is "No", the communication device STA1 will then perform step S650 to calculate a plurality of communication quality parameters for each access point, wherein the communication quality parameter of the preferred access point will be increased by a value "γ×PFB" (for example, 0.5) to increase the chance of the communication device STA1 connecting to the preferred access point. In some embodiments, "γ" is an adjustable parameter and "PFB" is a default parameter, and the user may adjust "γ" according to preference for a specific frequency band. In one embodiment, "γ" is approximately equal to "β" and "γ" is less than "α". In detail, the communication quality parameters of general access points (such as access point AP1) can be calculated by the aforementioned Formula (1), and the communication quality parameters of preferred access points (such as access points AP2-AP3) can be calculated by the following Formula (2).

$$Q_{MN} = \alpha \times RSSI_M + \frac{\beta}{CLM_N + NHM_N} + \gamma \times PFB \quad \text{Formula (2)}$$

In an exemplary embodiment, the communication quality parameters of the access points AP1-AP3 obtained in the process S650 are shown in Table 5 through table 7 below, wherein "α" and "PFB" are 1, and "β" and "γ" are 0.5.

TABLE 5

(the communication quality parameters of the access point AP1)

|  | Channel 1 | Channel 6 |
| --- | --- | --- |
| First percentage number | 2% | 3% |
| Second percentage number | 50% | 55% |
| communication quality parameter | −79.04 | −79.14 |

TABLE 6

(the communication quality parameters of the access point AP2)

|  | Channel 149 | Channel 153 | Channel 161 |
| --- | --- | --- | --- |
| First percentage number | 5.2% | 20% | 15% |
| Second percentage number | 5% | 7% | 2% |
| communication quality parameter | −77.6 | −80.65 | −79.56 |

TABLE 7

(the communication quality parameters of the access point AP3)

|  | Channel 153 | Channel 161 |
| --- | --- | --- |
| First percentage number | 20% | 15% |
| Second percentage number | 7% | 2% |
| communication quality parameter | −84.65 | −83.56 |

In step S660, the communication device STA1 may select the access point and the channel corresponding to the largest one of the plurality of communication quality parameters obtained in step S650 as the target access point and the target channel during connection, respectively. For example, the communication device STA1 may select "Channel 149" and the access point AP2 as the target channel and the target access point, and connect to the access point AP2 through "Channel 149".

By using the steps in FIG. 6, the communication device STA1 may connect to the access point that supports the user's preferred frequency band preferentially, and may select a channel with less noise and less delay in the user's preferred frequency band for communication, thereby helping improve user experience.

Figure 7:
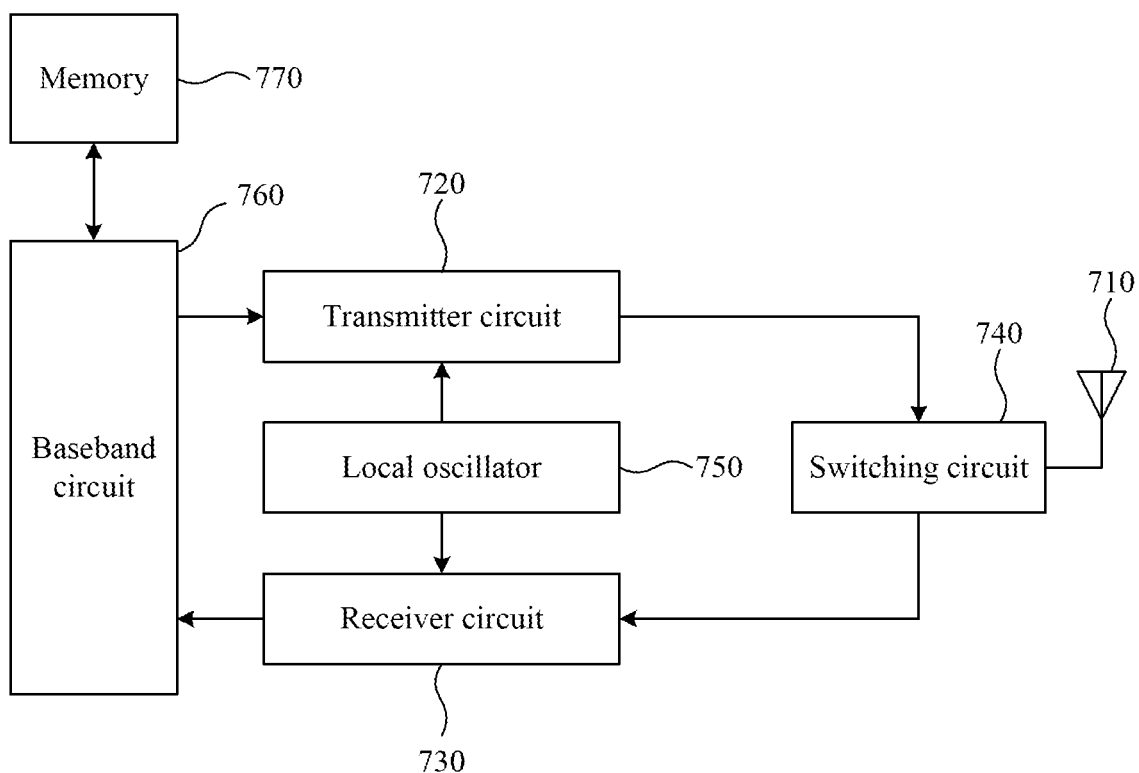
FIG. 7 is a simplified functional block diagram of a communication device in accordance with an embodiment of the present disclosure.

FIG. 7 is a simplified functional block diagram of a communication device 700 in accordance with an embodiment of the present disclosure. The communication device 700 may be used to implement the communication device STA1 in FIG. 1. The communication device 700 includes an antenna 710, a transmitter circuit 720, a receiver circuit 730, a switching circuit 740, a local oscillator 750, a baseband circuit 760 and a memory 770. The baseband circuit 760 is coupled to the transmitter circuit 720, the receiver circuit 730 and the memory 770. The transmitter circuit 720 and the receiver circuit 730 are coupled to the antenna 710 through the switching circuit 740. The local oscillator 750 is coupled to the transmitter circuit 720 and the receiver circuit 730.

The switching circuit 740 is configured to switch the antenna 710 to the transmitter circuit 720 or the receiver circuit 730 according to different operation modes. The antenna 710 is configured to receive or transmit radio-frequency signals in the 2.4 GHz and/or 5 GHz frequency bands. In some embodiments, the antenna 710 may be implemented as a plurality of antennas coupled to the transmitter circuit 720 and the receiver circuit 730 respectively, and the switching circuit 740 may be omitted. In other embodiments, the communication device 700 may include a plurality of combinations of the antenna 710, the transmitter circuit 720 and the receiver circuit 730, thus the communication device 700 has a multiple-input multiple-output (MIMO) function.

By cooperating with the local oscillator 750, the transmitter circuit 720 is configured to modulate the baseband signal generated by the baseband circuit 760 into a radio-frequency signal, and the receiver circuit 730 is configured to demodulate the radio-frequency signal received by the antenna 710 into a baseband signal.

The baseband circuit 760 is configured to perform the method 200 in the above-mentioned embodiments according to the baseband signal from the receiver circuit 730. Method 200 may be implemented by a plurality of instructions stored in a non-transitory computer-readable medium (e.g., the memory 770). These instructions cause some or all of the method 200 to be performed when the baseband circuit 760 executes the instructions. In some embodiments, the baseband circuit 760 may also be configured to perform clear channel assessment.

In some embodiments, the memory 770 is configured to store the classification thresholds and the interference thresholds discussed in step S240, and may also be configured to store the strength threshold discussed in step S610.

It is to be understood that the phraseology or terminology herein is for the purpose of description and not of limitation, such that the terminology or phraseology of the present specification is to be interpreted by those skilled in relevant art(s) in light of the teachings herein.

Certain terms are used in the description and claim to refer to particular elements. However, it should be understood by those skilled in the art that the same elements may be referred to by different terms. The description and the claims do not take the difference in name as a way of distinguishing elements, but take the difference in function of the elements as a basis for distinguishing. The term "comprising" mentioned in the description and the claims is an open-ended term, so it should be interpreted as "including but not limited to". In addition, the term "coupled" herein includes any direct and indirect means of connection. Therefore, if it is described in the description and the claims that the first element is coupled to the second element, it means that the first element may be directly connected to the second element through electrical connection or signal connection such as wireless transmission or optical transmission, or through other elements or connections.

As used herein, the term "and/or" includes any combination of one or more of the mentioned elements. Unless otherwise specified in the description, any term in the singular also includes the meaning in the plural.

The above are preferred embodiments of the present disclosure, and various modifications and equivalent changes may be made to the structure of the present disclosure without departing from the scope or spirit of the present disclosure. In view of the foregoing, it is intended that the present disclosure cover modifications and variations of this invention provided they fall within the scope of the following claims.

What is claimed is:

1. A method of selecting an access point for a communication device, wherein the communication device supports at least one frequency band, the method comprises:
   (a) monitoring a channel of the at least one frequency band;
   (b) calculating a first count that the channel is detected to be in an occupied state;
   (c) calculating a second count that the channel is detected to have an ambient noise;
   (d) repeating steps (a) to (c) to obtain the first count and the second count of each of a plurality of channels used by a plurality of access points;
   (e) obtaining a plurality of received signal strength indications (RSSIs) of the plurality of access points, respectively; and
   (f) selecting a target channel from the plurality of channels and a target access point from the plurality of access points to perform connection according to the plurality of RSSIs and the first count and the second count of each of the plurality of channels.

2. The method of claim 1, wherein step (b) comprises:
   during a monitoring period, detecting whether the channel is in the occupied state for every first default time interval, wherein detecting whether the channel is in the occupied state comprises: determining that the channel is in the occupied state when the channel is configured to transmit a packet in a predetermined format; and
   summing up times that the channel is determined to be in the occupied state during the monitoring period as the first count.

3. The method of claim 2, wherein the packet of the predetermined format is a Wi-Fi packet.

4. The method of claim 1, wherein step (c) comprises:
   during a monitoring period, detecting whether the channel has the ambient noise for every second default time interval, wherein detecting whether the channel has the ambient noise comprises: determining that the channel has the ambient noise when energy of a radio-frequency signal of the channel is greater than or equal to an interference threshold, and the radio-frequency signal is not generated by the communication device and does not comprise a packet in a predetermined format; and
   summing up times that the channel is determined to have the ambient noise during the monitoring period as the second count.

5. The method of claim 4, wherein the packet of the predetermined format is a Wi-Fi packet.

6. The method of claim 4, wherein the interference threshold is a value between −75 dBm and −92 dBm.

7. The method of claim 1, wherein step (f) comprises:
   calculating a plurality of communication quality parameters according to the plurality of RSSIs and the first count and the second count of each of the plurality of channels, wherein each of the plurality of communication quality parameters corresponds to a corresponding access point among the plurality of access points, and corresponds to a corresponding channel among the plurality of channels used by the corresponding access point; and
   selecting the target channel and the target access point to perform connection according to the plurality of communication quality parameters.

8. The method of claim 1, wherein one or more preferred access points of the plurality of access points support a preferred frequency band of the at least one frequency band, and the one or more preferred access points use a plurality of preferred channels of the plurality of channels, wherein step (f) comprises:
   when one or more RSSIs of the one or more preferred access points are greater than or equal to a strength threshold, selecting the target channel from the plurality of preferred channels and the target access point from the one or more preferred access points to perform connection according to the one or more RSSIs and the first count and the second count of each of the plurality of preferred channels; and
   when the one or more RSSIs of the one or more preferred access points are smaller than the strength threshold, selecting the target channel from the plurality of channels and the target access point from the plurality of access points to perform connection according to the plurality of RSSIs and the first count and the second count of each of the plurality of channels.

9. The method of claim 8, wherein when the one or more RSSIs of the one or more preferred access points are smaller than the strength threshold, selecting the target channel from the plurality of channels and the target access point from the plurality of access points to perform connection according to the plurality of RSSIs and the first count and the second count of each of the plurality of channels comprises:
  calculating a plurality of communication quality parameters according to the plurality of RSSIs and the first count and the second count of each of the plurality of channels, wherein each of the plurality of communication quality parameters corresponds to a corresponding access point among the plurality of access points, and corresponds to a corresponding channel among the plurality of channels used by the corresponding access point;
  raising one or more of the plurality of communication quality parameters corresponding to the one or more preferred access points by a predetermined value; and
  selecting the target channel and the target access point to perform connection according to the plurality of communication quality parameters.

10. The method of claim 1, wherein step (b) comprises: calculating a first percentage number of the first count to a first total detection count of detecting whether the channel is in the occupied state,
  wherein step (c) comprises calculating a second percentage number of the second count to a second total detection count of detecting whether the channel has the ambient noise,
  wherein step (d) comprises repeating steps (a) to (c) to obtain the first percentage number and the second percentage number of each of the plurality of channels,
  wherein step (f) comprises selecting the target channel and the target access point to perform connection according to the plurality of RSSIs and the first percentage number and the second percentage number of each of the plurality of channels.

11. The method of claim 10, wherein selecting the target channel and the target access point to perform connection according to the plurality of RSSIs and the first percentage number and the second percentage number of each of the plurality of channels comprises:
  calculating a plurality of communication quality parameters according to the plurality of RSSIs and the first percentage number and the second percentage number of each of the plurality of channels, wherein each of the plurality of communication quality parameters corresponds to a corresponding access point among the plurality of access points, and corresponds to a corresponding channel among the plurality of channels used by the corresponding access point; and
  selecting the target channel and the target access point to perform connection according to the plurality of communication quality parameters.

12. The method of claim 10, wherein one or more preferred access points of the plurality of access points support a preferred frequency band of the at least one frequency band, and the one or more preferred access points use a plurality of preferred channels of the plurality of channels, wherein selecting the target channel and the target access point to perform connection according to the plurality of RSSIs and the first percentage number and the second percentage number of each of the plurality of channels comprises:
  when one or more RSSIs of the one or more preferred access points are greater than or equal to a strength threshold, selecting the target channel from the plurality of preferred channels and the target access point from the one or more of preferred access points to perform connection according to the one or more RSSIs and the first percentage number and the second percentage number of each of the plurality of preferred channels; and
  when the one or more RSSIs of the one or more preferred access points are smaller than the strength threshold, selecting the target channel from the plurality of channels and the target access point from the plurality of access points to perform connection according to the plurality of RSSIs and the first percentage number and the second percentage number of each of the plurality of channels.

13. The method of claim 12, wherein when the one or more RSSIs of the one or more preferred access points are smaller than the strength threshold, selecting the target channel from the plurality of channels and the target access point from the plurality of access points to perform connection according to the plurality of RSSIs and the first percentage number and the second percentage number of each of the plurality of channels comprises:
  calculating a plurality of communication quality parameters according to the plurality of RSSIs and the first percentage number and the second percentage number of each of the plurality of channels, wherein each of the plurality of communication quality parameters corresponds to a corresponding access point among the plurality of access points, and corresponds to a corresponding channel among the plurality of channels used by the corresponding access point;
  raising one or more of the plurality of communication quality parameters corresponding to the one or more preferred access points by a predetermined value; and
  selecting the target channel and the target access point to perform connection according to the plurality of communication quality parameters.

14. A communication device, comprising:
  an antenna, configured to transmit or receive radio-frequency signals in at least one frequency band; and
  a baseband circuit, coupled to the antenna and configured for:
  (a) monitoring a channel of the at least one frequency band;
  (b) calculating a first count that the channel is detected to be in an occupied state;
  (c) calculating a second count that the channel is detected to have an ambient noise;
  (d) repeating steps (a) to (c) to obtain the first count and the second count of each of a plurality of channels used by a plurality of access points;
  (e) obtaining a plurality of received signal strength indications (RSSIs) of the plurality of access points, respectively; and
  (f) selecting a target channel from the plurality of channels and a target access point from the plurality of access points to perform connection according to the plurality of RSSIs and the first count and the second count of each of the plurality of channels.

15. The communication device of claim 14, wherein step (b) comprises:
- during a monitoring period, detecting whether the channel is in the occupied state for every first default time interval, wherein detecting whether the channel is in the occupied state comprises: determining that the channel is in the occupied state when the channel is configured to transmit a packet in a predetermined format; and
- summing up times that the channel is determined to be in the occupied state during the monitoring period as the first count.

16. The communication device of claim 14, wherein step (c) comprises:
- during a monitoring period, detecting whether the channel has the ambient noise for every second default time interval, wherein detecting whether the channel has the ambient noise comprises: determining that the channel has the ambient noise when energy of a radio-frequency signal of the channel is greater than or equal to an interference threshold, and the radio-frequency signal is not generated by the communication device and does not comprise a packet in a predetermined format; and
- summing up times that the channel is determined to have the ambient noise during the monitoring period as the second count.

17. The communication device of claim 14, wherein step (f) comprises:
- calculating a plurality of communication quality parameters according to the plurality of RSSIs and the first count and the second count of each of the plurality of channels, wherein each of the plurality of communication quality parameters corresponds to a corresponding access point among the plurality of access points, and corresponds to a corresponding channel among the plurality of channels used by the corresponding access point; and
- selecting the target channel and the target access point to perform connection according to the plurality of communication quality parameters.

18. The communication device of claim 14, wherein one or more preferred access points of the plurality of access points support a preferred frequency band of the at least one frequency band, and the one or more preferred access points use a plurality of preferred channels of the plurality of channels, wherein step (f) comprises:
- when one or more RSSIs of the one or more preferred access points are greater than or equal to a strength threshold, selecting the target channel from the plurality of preferred channels and the target access point from the one or more preferred access points to perform connection according to the one or more RSSIs and the first count and the second count of each of the plurality of preferred channels; and
- when the one or more RSSIs of the one or more preferred access points are smaller than the strength threshold, selecting the target channel from the plurality of channels and the target access point from the plurality of access points to perform connection according to the plurality of RSSIs and the first count and the second count of each of the plurality of channels.

19. The communication device of claim 18, wherein when the one or more RSSIs of the one or more preferred access points are smaller than the strength threshold, selecting the target channel from the plurality of channels and the target access point from the plurality of access points to perform connection according to the plurality of RSSIs and the first count and the second count of each of the plurality of channels comprises:
- calculating a plurality of communication quality parameters according to the plurality of RSSIs and the first count and the second count of each of the plurality of channels, wherein each of the plurality of communication quality parameters corresponds to a corresponding access point among the plurality of access points, and corresponds to a corresponding channel among the plurality of channels used by the corresponding access point;
- raising one or more of the plurality of communication quality parameters corresponding to the one or more preferred access points by a predetermined value; and
- selecting the target channel and the target access point to perform connection according to the plurality of communication quality parameters.

20. The communication device of claim 14, wherein step (b) comprises: calculating a first percentage number of the first count to a first total detection count of detecting whether the channel is in the occupied state,
- wherein step (c) comprises: calculating a second percentage number of the second count to a second total detection count of detecting whether the channel has the ambient noise,
- wherein step (d) comprises: repeating steps (a) to (c) to obtain the first percentage number and the second percentage number of each of the plurality of channels,
- wherein step (f) comprises: selecting the target channel and the target access point to perform connection according to the plurality of RSSIs and the first percentage number and the second percentage number of each of the plurality of channels.

* * * * *